(12) United States Patent
Kotani

(10) Patent No.: US 8,565,555 B2
(45) Date of Patent: Oct. 22, 2013

(54) IMAGE PROCESSING APPARATUS AND IMAGE PROCESSING METHOD

(75) Inventor: Takuya Kotani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 569 days.

(21) Appl. No.: 12/856,971

(22) Filed: Aug. 16, 2010

(65) Prior Publication Data

US 2011/0043667 A1  Feb. 24, 2011

(30) Foreign Application Priority Data

Aug. 20, 2009  (JP) ................................. 2009-191071

(51) Int. Cl.
*G06K 9/32* (2006.01)
(52) U.S. Cl.
USPC ............................ 382/299; 382/275; 382/173
(58) Field of Classification Search
None
See application file for complete search history.

(56) References Cited

U.S. PATENT DOCUMENTS

| | | | |
|---|---|---|---|
| 5,521,718 A * | 5/1996 | Eschbach | 382/233 |
| 5,534,925 A * | 7/1996 | Zhong | 348/384.1 |
| 6,603,885 B1 | 8/2003 | Enomoto | |
| 6,943,807 B2 | 9/2005 | Xavier | |
| 6,995,775 B2 | 2/2006 | Xavier | |
| 6,999,099 B2 | 2/2006 | Xavier | |
| 7,009,623 B2 | 3/2006 | Xavier | |
| 2001/0008418 A1 | 7/2001 | Yamanaka et al. | |
| 2004/0160439 A1 | 8/2004 | Xavier | |
| 2004/0218834 A1 * | 11/2004 | Bishop et al. | 382/299 |
| 2005/0157950 A1 | 7/2005 | Xavier | |
| 2005/0157951 A1 | 7/2005 | Xavier | |
| 2005/0169557 A1 | 8/2005 | Xavier | |
| 2006/0120620 A1 * | 6/2006 | Bassi et al. | 382/276 |
| 2011/0091065 A1 * | 4/2011 | Chandrashekar et al. | 382/100 |

FOREIGN PATENT DOCUMENTS

| | | |
|---|---|---|
| CN | 101206763 A | 6/2008 |
| JP | 2001-197354 A | 7/2001 |
| JP | 2004-153668 A | 5/2004 |
| JP | 2007-267378 A | 10/2007 |

OTHER PUBLICATIONS

Sung C. P, Min K. P, "Super-Resolution Image Reconstruction: A technical Overview", IEEE Signal Proc. Magazine, vol. 26, No. 3, p. 21-36, 2003.
R. R. Schulz, R. L. Stevenson, "Extraction of high-resolution frames from video sequences", IEEE Trans. Image Processing, vol. 5, p. 996-1011, 1996.

* cited by examiner

*Primary Examiner* — Chan S Park
*Assistant Examiner* — Mark Roz
(74) *Attorney, Agent, or Firm* — Canon USA Inc. IP Division

(57) ABSTRACT

An image processing apparatus for generating corrected image data from a plurality of input image data by performing an iterative calculation process includes an input unit configured to input the plurality of input image data, an acquisition unit configured to acquire a photographing parameter used for photographing to acquire the input image data, a setting unit configured to set for each image area a number of iterations for generating the corrected image data based on the photographing parameter, and a generation unit configured to generate correction data from the plurality of image data by performing an iterative calculation process on each image area based on the number of iterations set for each image area.

11 Claims, 15 Drawing Sheets

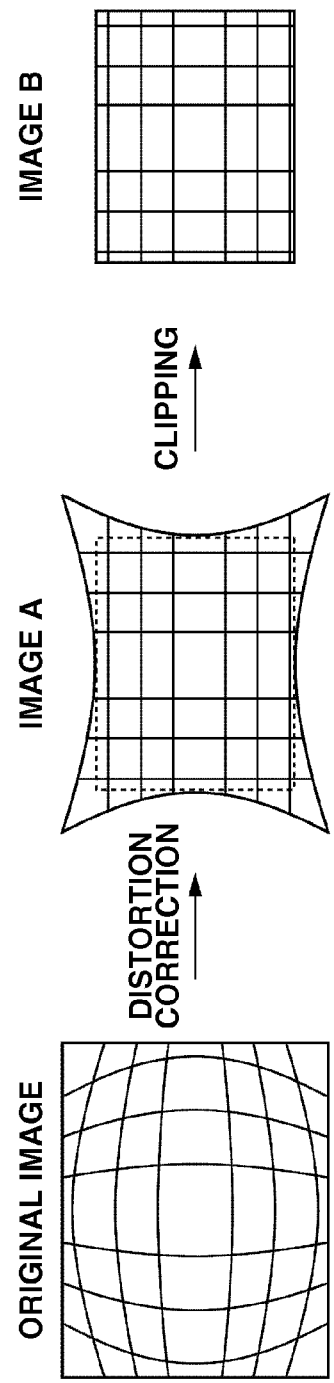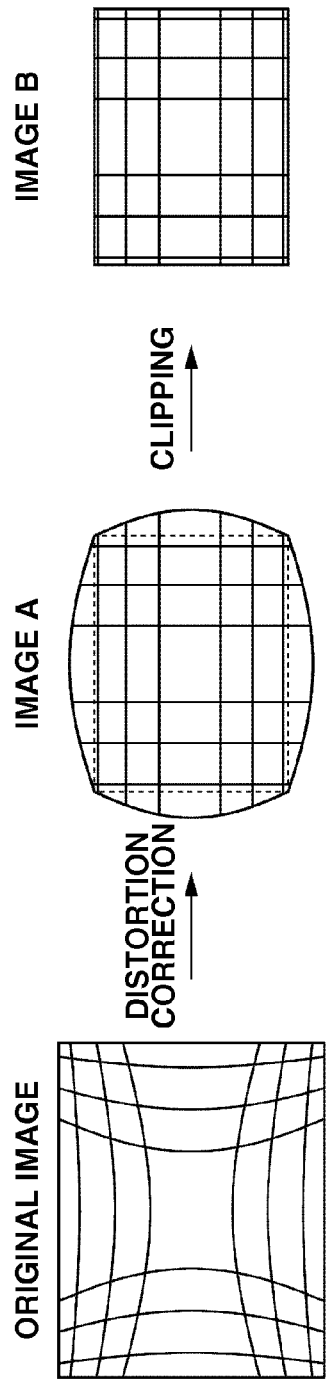

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

There is a process for correcting image deterioration referred to as lens aberration in an image photographed by a camera, using a characteristic value of the lens. Conventionally, distortion and chromatic aberration of magnification among lens aberrations are generated by a deviation between an image height of an image to be formed and the image height which is actually acquired via the lens. The image height indicates a distance from an optical axis. One method for correcting such aberration is to convert coordinates of each of the pixels so that the image height is at a correct position.

In the case of bit map data, i.e., a digital image, the coordinates before and after performing coordinate conversion do not necessarily match. An image transformation process involving coordinate conversion thus generally calculates the pixel values after image transformation is performed as follows. The coordinates after the image is transformed are converted to the coordinates before the image is transformed, and the adjacent pixels are then interpolated according to the converted coordinates.

When such an image transformation process is applied, the edge portion of the image is greatly enlarged, particularly in the case where the process is the lens aberration correction process. Further, the sharpness is greatly reduced when there is a large displacement of the coordinates. A keystone correction process which is performed in a projector is another example of the image transformation process that involves coordinate conversion in which the displacement varies depending on the position of the image.

There are two methods of solving such reduction of sharpness, i.e., by improving the interpolation process and by recovering the reduced resolution.

In the case of improving the interpolation process, it is assumed that the sharpness reduction is caused by the interpolation process. The interpolation process itself is thus recreated by combining the process with edge detection (refer to Japanese Patent Application Laid-Open No. 2004-153668). In such a method, a positive result can be acquired when the image contains very little noise. However, a positive result cannot be acquired in the case of an image which is normally acquired using a digital camera and includes noise.

On the other hand, the reduced sharpness may be recovered by controlling sharpness intensity or controlling the amount of noise.

In the case where the sharpness intensity is controlled to recover the reduced sharpness, the sharpness intensity corresponding to the status of the lens is applied to each pixel to compensate for the reduced sharpness (refer to U.S. Pat. No. 6,603,885). However, the noise included in the photographed image also becomes defocused due to image enlargement, so that a positive result cannot be acquired by only adjusting the sharpness intensity (or a filter radius).

In the case where the amount of noise is controlled to recover the reduced sharpness, noise is added to the interpolation result by considering the amount of noise before image transformation to recover the reduced sharpness due to image enlargement. As a result, the noise reduced by the interpolation process is recovered, and apparent sharpness can be improved. However, if the image to be processed does not contain much noise, the sharpness cannot be improved.

To solve the above-described problems, there is super-resolution processing which is a technique for generating a super-resolution image having a large number of pixels while inputting a plurality of low-resolution images. Since frequency bandwidths of signals included in the low-resolution image are limited, there is a limit in improving the sharpness. The high-resolution image is thus generated using a plurality of low-resolution images. The reduced sharpness due to correcting the lens aberration can be recovered by applying such a technique. For example, Japanese Patent Application Laid-Open No. 2001-197354 discusses a method for acquiring a correction result by determining an evaluation function from a deterioration process of an image pickup system.

There are various super-resolution methods. For example, there is an image capturing method which generates a high-resolution image by combining low-resolution images in which there is a positional deviation between a plurality of frames (Sung C. P, Min K. P, "Super-Resolution Image Reconstruction: A technical Overview", IEEE Signal Proc. Magazine, Vol. 26, No. 3, P. 21-36, 2003). Further, a method which is based on a maximum a posteriori (MAP) estimation (R. R. Schulz, R. L. Stevenson, "Extraction of high-resolution frames from video sequences", IEEE Trans. Image Processing, Vol. 5, p. 996-1011, 1996) is well-known. The MAP estimation method is a method for estimating the image in which posterior probability becomes greatest according to a preset probability density function. When the MAP estimation method is applied to the super-resolution processing, it can be seen as estimating a high-resolution image that minimizes the evaluation function in which probability information of the high-resolution image is added to a square error. In other words, when the MAP estimation method is employed in performing the super-resolution processing, the high-resolution image is estimated by solving an optimization problem to maximize the posterior probability by using forecast information of the high-resolution image.

However, the estimation process in the super-resolution processing is generally a very heavy process. For example, in the method discussed in R. R. Schulz, R. L. Stevenson, "Extraction of high-resolution frames from video sequences", IEEE Trans. Image Processing, Vol. 5, p. 996-1011, 1996, it is necessary to solve the optimization problem to acquire the high resolution image and to perform iterative processing. A large processing load is thus required to acquire an image as a result of the super-resolution processing. If the above-described function is to be realized by a digital single-reflex camera, problems may be generated, such as reduction of continuous shooting speed, or requirement of incorporating a high-speed processor so that power consumption becomes large.

SUMMARY OF THE INVENTION

According to an aspect of the present invention, an image processing apparatus for generating corrected image data from a plurality of input image data by performing an iterative calculation process includes an input unit configured to input the plurality of input image data, an acquisition unit configured to acquire a photographing parameter used for photographing to acquire the input image data, a setting unit configured to set for each image area a number of iterations for generating the corrected image data based on the photographing parameter, and a generation unit configured to generate correction data from the plurality of image data by performing an iterative calculation process on each image area based on the number of iterations set for each image area.

According to an exemplary embodiment of the present invention, the sharpness which is reduced by image transformation can be restored to achieve higher image quality and low cost.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A and 5B illustrate distortion correction.

DESCRIPTION OF THE EMBODIMENTS

Various exemplary embodiments, features, and aspects of the invention will be described in detail below with reference to the drawings.

Generally, the digital camera outputs to a recording medium an image that is exposed for a designated exposure time. However, according to the present exemplary embodiment, high-quality corrected image data is acquired from a plurality of image data by performing the super-resolution processing. In other words, a plurality of frame image data is acquired by performing time-division exposure while the designated exposure time elapses. The high-image quality corrected image data is then acquired by performing the super-resolution processing on the acquired frame images.

The image transformation process associated with shifting of the coordinates according to an exemplary embodiment of the present invention is the lens aberration correction process. In particular, a distortion correction process will be described as an example of the lens aberration correction process. However, chromatic aberration of magnification correction corrects an aberration amount (distortion amount) generated by a deviation between an ideal image height and a photographed image height, similar to distortion correction. The chromatic aberration of magnification correction process may thus be included in the lens aberration correction process.

Either of the lens aberration correction process or the super-resolution processing may be applied first. According to the first exemplary embodiment of the present invention, the lens aberration correction process is applied first. According to the second exemplary embodiment, super-resolution processing is applied first.

Figure 1:
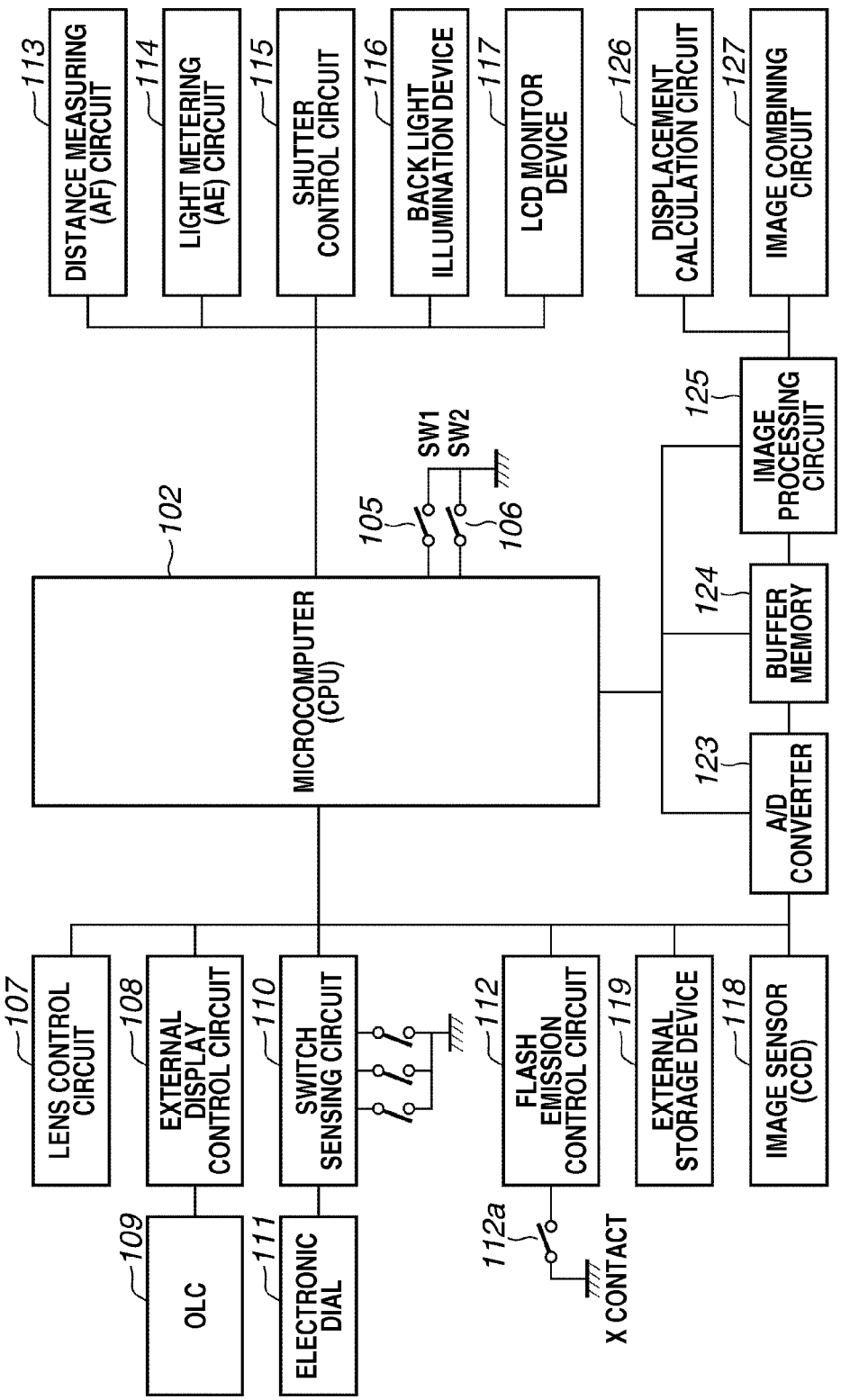
FIG. 1 illustrates an example of a circuit configuration of an interchangeable lens-single reflex digital camera, which is an example of an image processing apparatus.

FIG. 1 illustrates an example of a circuit configuration of an interchangeable lens-single reflex digital camera, which is an example of an image processing apparatus.

Referring to FIG. 1, a microcomputer 102 controls operations of the entire camera. For example, the microcomputer 102 controls processing of image data output from an image sensor (i.e., a charge-coupled device (CCD) according to the present exemplary embodiment) 118, and display control of a liquid crystal display (LCD) monitor device 117.

Figure 2:
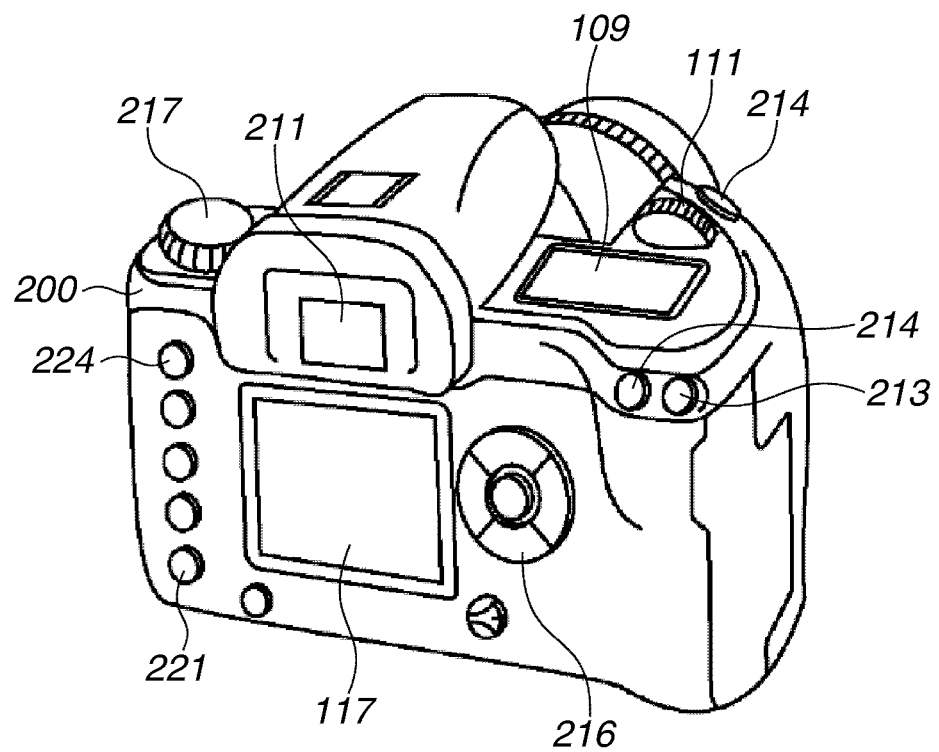
FIG. 2 illustrates an external perspective view of the digital camera.

A switch (SW1) 105 is switched on when a user half-presses a release button 214 (refer to FIG. 2). When the switch (SW1) 105 is switched on, the digital camera according to the present exemplary embodiment prepares for photographing. A switch (SW2) 106 is switched on when the user fully-presses the release button 214. When the switch (SW2) 106 is switched on, the digital camera according to the present exemplary embodiment starts photographing.

A lens control circuit 107 controls communication with a photographic lens 300 (refer to FIG. 3), and driving of the photographic lens 300 when performing automatic focusing (AF) and of a diaphragm blade.

An external display control circuit 108 controls an external display device (OLC) 109 and a display device (not illustrated) of a viewfinder. A switch sensing circuit 110 transmits signals to the microcomputer 102 from various switches including an electronic dial 111 attached to the camera.

A flash emission control circuit 112 is grounded via an X contact 112a and controls an external flash. A distance measuring circuit 113 detects a defocus amount of an object for performing AF. A light metering circuit 114 measures brightness of an object.

A shutter control circuit 115 controls the shutter and performs appropriate exposure of the image sensor. The LCD monitor device 117 and a backlight illumination device 116 form an image display device. A storage device 119 is, for example, a hard disk drive or a semiconductor memory card capable of being detachably-attached to the camera.

The microcomputer 102 is connected to an analog/digital (A/D) converter 123, an image-buffer memory 124, and an image processing circuit 125 which is formed by a digital signal processor (DSP). The microcomputer 102 is also connected to a displacement calculation circuit 126 and an image combining circuit 127, which are necessary in performing the super-resolution processing to be described below.

Figure 3:
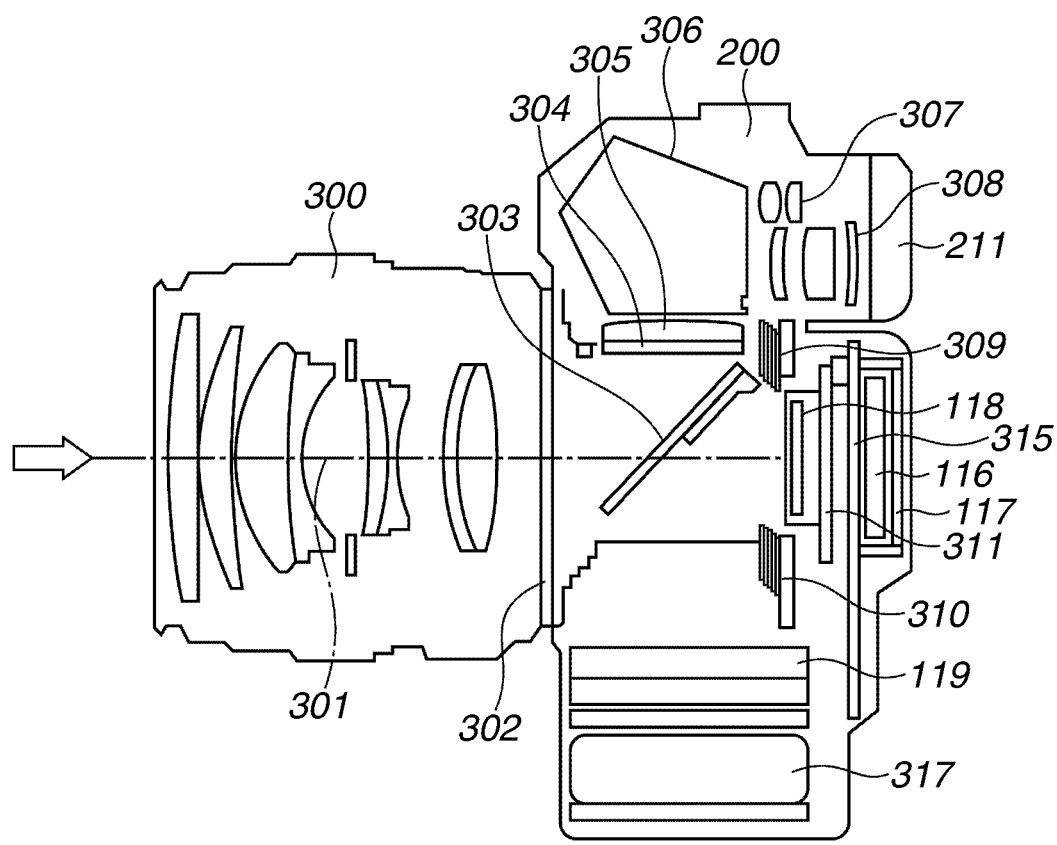
FIG. 3 illustrates a longitudinal cross-sectional view of the digital camera.

FIG. 2 illustrates an external perspective view of the digital camera. FIG. 3 illustrates a longitudinal sectional view of the digital camera.

Referring to FIG. 2, a viewfinder observation eyepiece window 211, an auto exposure (AE) lock button 212, an AF measuring distance point selection button 213, and the release button 214 for photographing are disposed on a top portion of a camera main body 200. Further, the electronic dial 111, a photographing mode selection dial 217, and the external display device 109 are disposed on the top portion of the camera main body 200. The electronic dial 111 is a multi-functional signal input device used by the user to input a numerical value into the camera and switch a photographing mode in cooperation with another operation button. The external display device 109 is formed by the LCD and displays photographing conditions such as a shutter speed, an aperture value, and the photographing mode, and other information.

The LCD monitor device 117, which displays the photographed image and various setting windows, a monitor switch 221 for turning on/off the LCD monitor device 117, a cross-shaped switch 216, and a menu button 224 are disposed on a back surface of the camera main body 200.

The cross-shaped switch 216 has four buttons which are arranged up, down, right, and left, and a SET button which is arranged at the center. The cross-shaped switch 216 is used when the user instructs the camera to select and execute a menu item displayed on the LCD monitor device 117.

The menu button 224 is used to display a menu window for displaying various settings of the camera on the LCD monitor device 117. For example, when selecting and setting the photographing mode, the user presses the menu button 224 and selects the desired mode by operating on the upper, lower, right, and left buttons of the cross-shaped switch 216. The user then presses the SET button while the desired mode is selected, and the setting is completed. The menu button 224 and the cross-shaped switch 216 are also used to set a lens aberration correction mode to be described below. Since the LCD monitor device 117 according to the present exemplary embodiment is of a transmission type, an image cannot be viewed by only driving the LCD monitor device 117. The backlight illumination device 116 is always necessary on the backside of the LCD monitor device 117 as illustrated in FIG. 3. The LCD monitor device 117 and the backlight illumination device 116 thus form the image display device.

Referring to FIG. 3, a photographic lens 300 of the imaging optical system is exchangeable from the camera main body 200 via a main body mount 302. A photographing optical axis 301 runs through a quick-return mirror 303.

The quick-return mirror 303 is inserted in a photographing optical path. The quick-return mirror 303 can be moved between a position (as illustrated in FIG. 3, to be referred to as an inclined position) at which the quick-return mirror 303 guides object light from the photographic lens 200 to a viewfinder optical system, and a position (to be referred to as a retracted position) at which the quick-return mirror 303 retracts from the photographing optical path.

The object light guided from the quick-return mirror 303 to the viewfinder optical system forms an image on a focusing screen 304. A condenser lens 305 improves the visibility of the viewfinder. The condenser lens 305 and a pentagonal roof prism 306 guide the object light passing through the focusing screen 304 and the condenser lens 305 to a viewfinder observation eyepiece lens 308 and a light metering sensor 307.

A second curtain 309 and a first curtain 310 form the shutter. The image sensor 118, i.e., a solid-state image sensor, arranged at the back is exposed to light for a set period of time by releasing the rear curtain 309 and the front curtain 310. A photographed image which is converted into an electrical signal of each pixel by the image sensor 118 is processed by the A/D converter 123 and the image processing circuit 125, and recorded as image data on a storage device 119 illustrated in FIG. 1.

The image sensor 118 is held by a printed circuit board 311. A display substrate 315 which is another printed circuit board is arranged on the backside of the printed circuit board 311. The LCD monitor device 117 and the backlight illumination device 116 are arranged on a side of the display substrate 315 opposite to the printed circuit board 311.

The storage device 119 records image data. The storage device 119 and a battery 317 (portable power supply) are detachably-attached to the camera main body.

Figure 4:
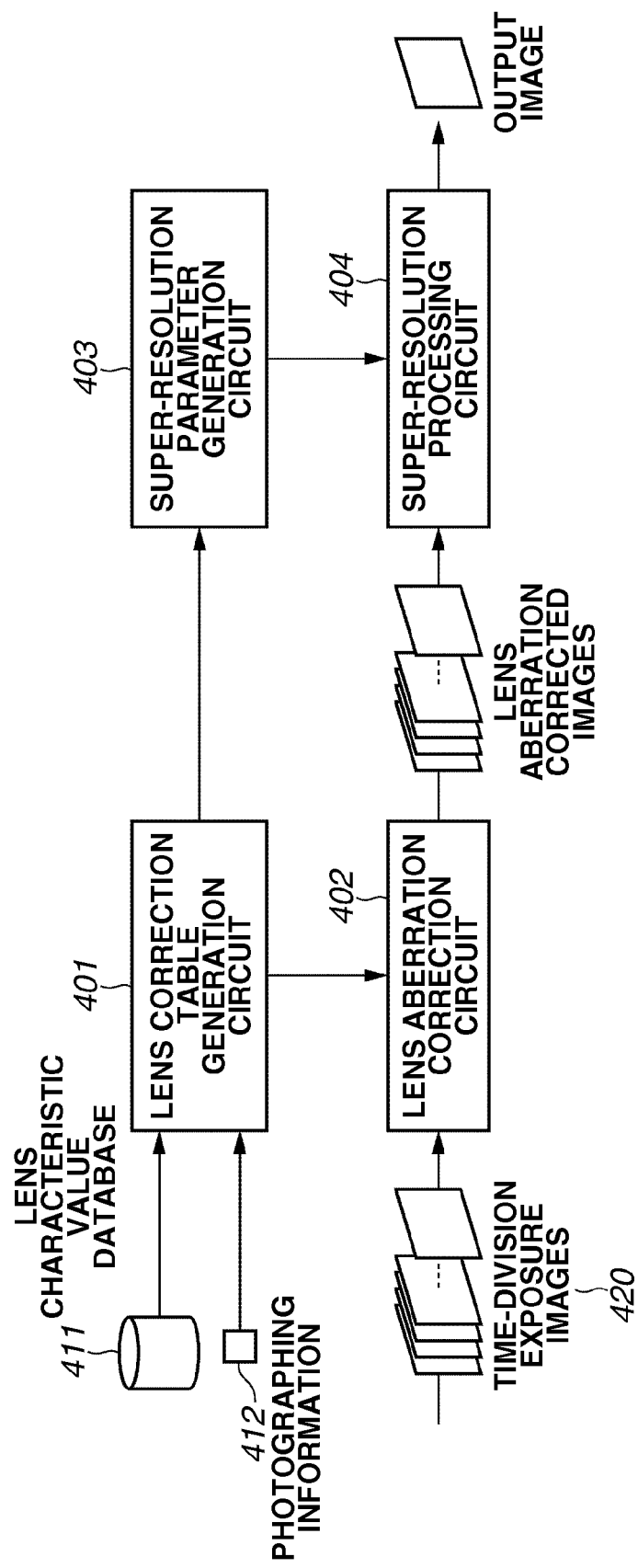
FIG. 4 illustrates a configuration of a digital camera which performs the lens aberration correction process according to a first exemplary embodiment of the present invention.

FIG. 4 illustrates a configuration of the digital camera which performs the lens aberration correction process according to the first exemplary embodiment. The digital camera according to the present exemplary embodiment is different from a conventional digital camera in performing time-division exposure during the designated exposure time. Frame images 420 acquired by performing time-division exposure become an input signal to the image processing circuit 125. A lens aberration correction circuit 402 is included in the image processing circuit 125.

A lens correction table generation circuit 401 acquires lens characteristic values (i.e., data of the target lens on whether the pixel is shifted in correspondence to photographing information (to be described below), defined for each image height) from a lens characteristic value database 411. Further, the lens correction table generation circuit 401 acquires the photographing information (photographing parameters) 412 acquired as outputs from the lens control circuit 107, the shutter control circuit 115, and the distance measuring (AF) circuit 113. Examples of the photographing information are a zoom position, an aperture value, and a shooting distance. The lens correction table generation circuit 401 then generates (calculates) the lens correction table (displacement) for each image height based on the acquired lens characteristic values. The lens correction table generation circuit 401 is included in the displacement calculation processing circuit 126.

The lens correction table indicates a combination of the image height when photographing and the ideal image height corresponding thereto. The lens correction table generation circuit 401 performs spline interpolation on the lens characteristic value corresponding to the photographing information and acquires the ideal image height corresponding to the image height of each pixel (refer to FIG. 6 to be described below).

A super-resolution processing circuit 404 performs the super-resolution processing on the frame images on which the lens aberration correction circuit 402 has performed the lens aberration correction process (i.e., a plurality of lens aberration-corrected images). An image in which the sharpness (perceived resolution) is not reduced in the image periphery is thus acquired. A super-resolution parameter generation circuit 403 then determines the parameter for performing the super-resolution processing according to the lens correction table. Further, an output resolution of the super-resolution processing circuit 404 is the same as the resolution of the input image data. The super-resolution parameter generation circuit 403 and the super-resolution processing circuit 404 are included in the image combining circuit 127.

The lens aberration correction process according to the present exemplary embodiment will be described below. As described above, according to the present exemplary embodiment, the distortion correction process will be described as an example of the lens aberration correction process for ease of description.

FIG. 5A illustrates a case where an image which is distorted into a barrel shape is corrected. FIG. 5B illustrates a case where an image which is distorted into a pincushion shape is corrected. Distortion is corrected by shifting the pixel positions, and the displacement is complexly changed for each image height. Chromatic aberration of magnification, which is also corrected by shifting the pixel positions, is generated by a difference in the deviations due to wavelengths of the input light. In general, such lens aberration is rotationally symmetric around the optical axis. The process thus becomes redundant if the image height is calculated for each pixel, and the correction amount corresponding to the image height is then calculated from the lens characteristic amount.

Figure 6:
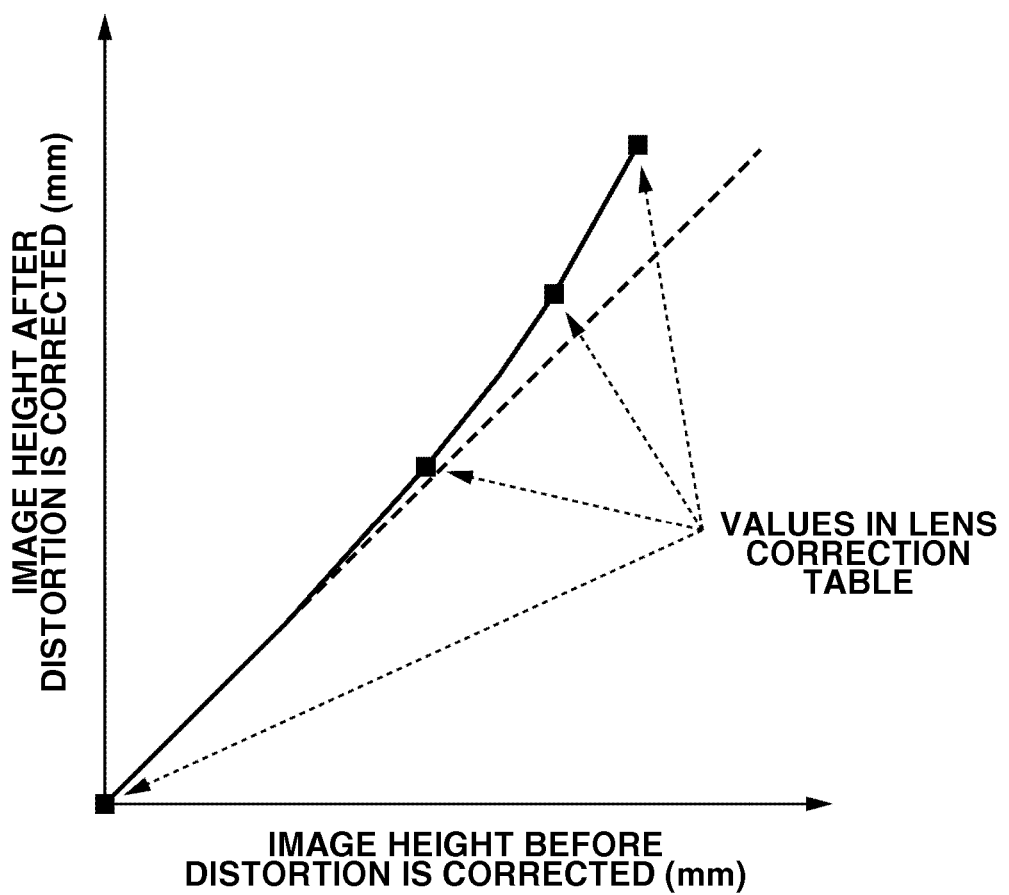
FIG. 6 illustrates characteristic values of lens.

The lens correction table generation circuit 401 thus generates the lens correction table in which spline interpolation is performed on the lens characteristic values, as illustrated in FIG. 6. The lens aberration correction circuit 402 then refers to the generated lens correction table and applies the lens aberration correction process. A broken line illustrated in FIG. 6 indicates cases where the image heights match before and after correcting the lens aberration. In the example illustrated in FIG. 6, an interpolated curve passes above the broken line, so that the distortion is barrel-shaped. The image in which the lens aberration is corrected becomes more enlarged when the image height is higher.

Figure 7A:
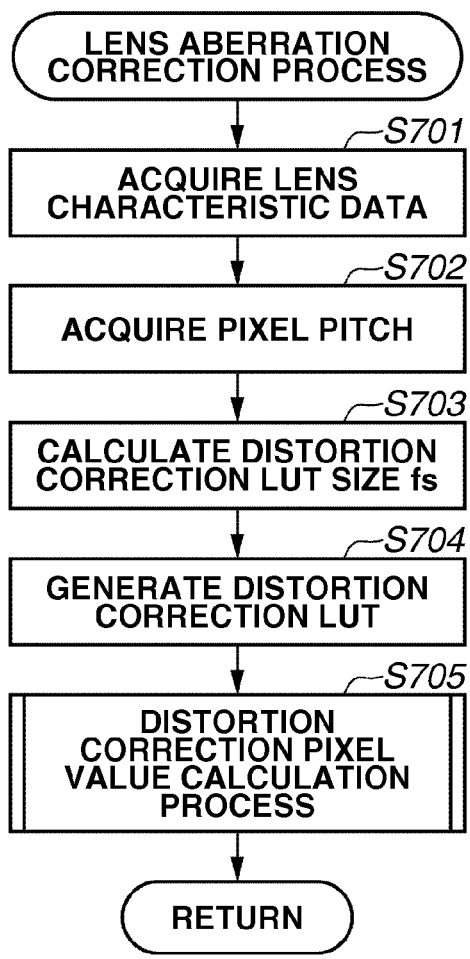
FIGS. 7A and 7B are flowcharts illustrating an example of the lens correction process.

FIG. 7A is a flowchart illustrating an example of the distortion correction process.

In step S701, the lens correction table generation circuit 401 acquires from the lens characteristic value database 411 the lens characteristic data corresponding to the photographing information (e.g., type of lens, focal length, and f-value) of the image to be processed. The characteristic data for correcting the distortion, which is an example of the lens correction table according to the present exemplary embodiment, is the data of the image height before correcting the distortion with respect to the image height after correcting the distortion.

In step S702, the lens correction table generation circuit 401 acquires from the photographing information of the image to be processed a pixel pitch of the image to be processed. The pixel pitch is a distance between the pixels, and the pixel pitch according to the present exemplary embodiment indicates a distance by millimeter on the image sensor.

In step S703, the lens correction table generation circuit 401 calculates a distortion correction LUT size fs based on equation (1) described below using the image size (i.e., fw pixel width and fh pixel height). In equation (1), fs is a distance from the center of a fit display image to a vertex in units of pixels.

$$fs=\sqrt{(((fw/2) \times (fw/2))+((fh/2) \times (fh/2)))} \quad (1)$$

In step S704, the lens correction table generation circuit 401 performs spline interpolation on the lens characteristic data acquired in step S701 and generates the distortion correction LUT of the size acquired in step S703. The distance from the center of the image to be processed is input to the distortion correction LUT, and the distance from the center of the image data after correcting the distortion is output from the distortion correction LUT. Both distances are in units of pixels.

Figure 8:
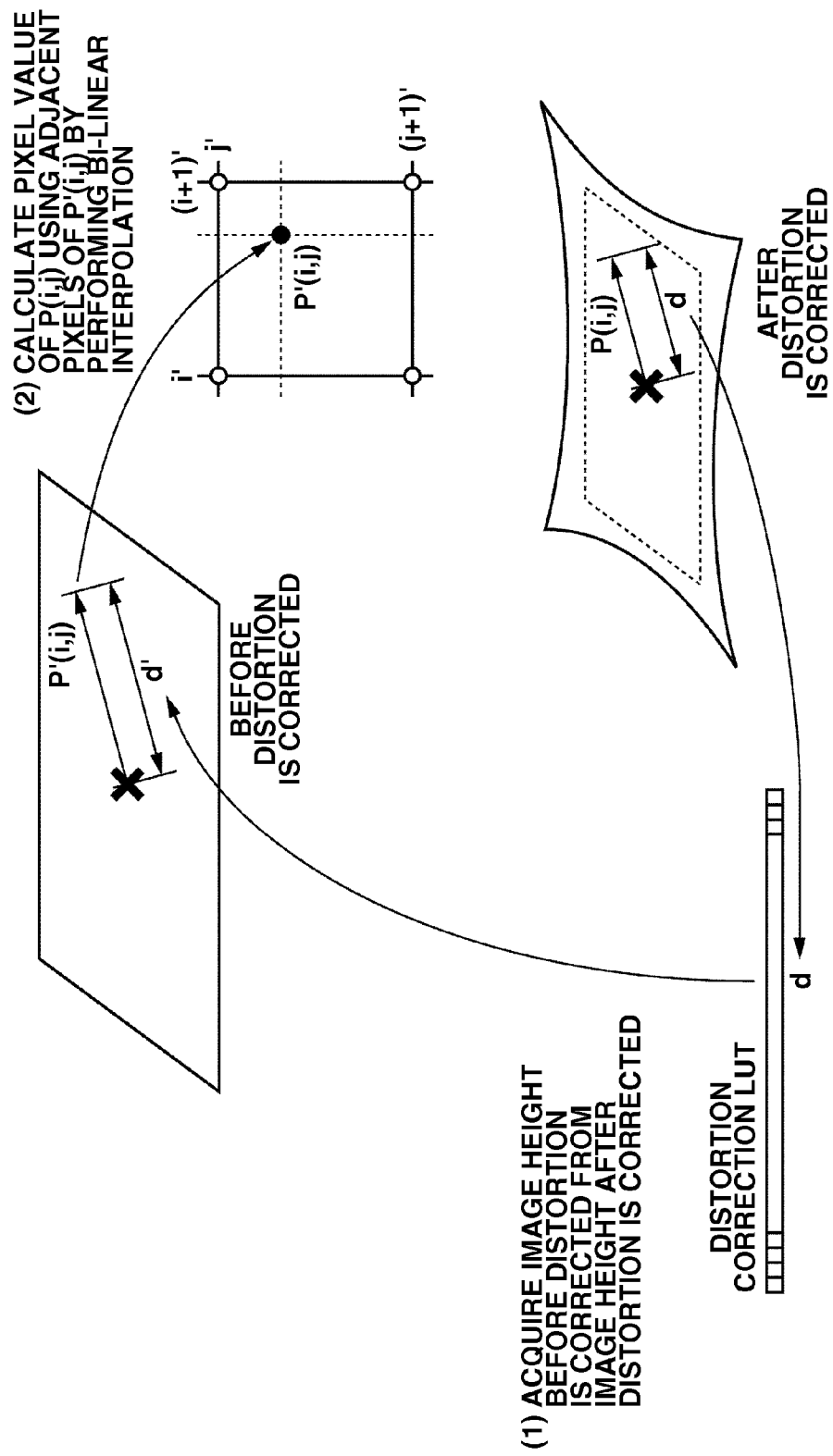
FIG. 8 illustrates a process for calculating a pixel value of a designated pixel (i, j) using a distortion correction look-up table (LUT).

In step S705, the lens aberration correction circuit 402 calculates a pixel value after correcting the distortion as illustrated in FIG. 8 for each pixel in the image data after correcting the distortion. Upon calculating the pixel values for all pixels, the process ends.

Figure 7B:
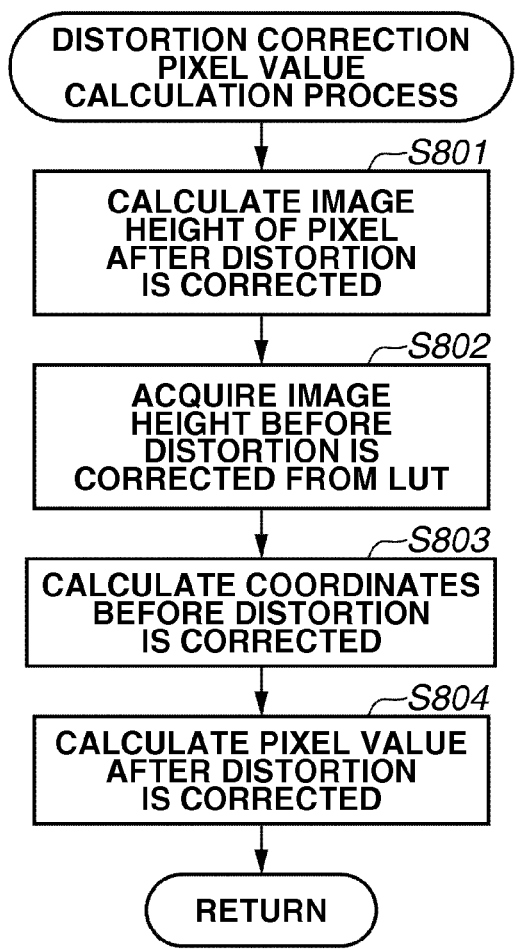

FIG. 7B is a flowchart illustrating an example of the process for calculating the pixel value after correcting the distortion, performed in step S705 illustrated in FIG. 7A.

The process for calculating the pixel value after correcting the distortion is a process for calculating the pixel value of a designated pixel (i, j) in the image to be processed of fw pixels width and fh pixels height. The pixel value is calculated using the distortion correction LUT.

In step S801, the lens aberration correction circuit 402 acquires the distance from the center of the image to the pixel (i, j) (i.e., the image height), in units of pixels.

In step S802, the lens aberration correction circuit 402 acquires a correction amount corresponding to the image height (i.e., the image height before performing distortion correction) using the distortion correction LUT. When the image height does not become an integer value, the lens aberration correction circuit 402 calculates the correction amount by linear interpolation.

In step S803, the lens aberration correction circuit 402 calculates using the correction amount calculated in step S802 the coordinates in a reduced image before correcting the distortion. The lens aberration correction circuit 402 calculates the coordinates using equation (2).

$$I'(i,j)=d' \times I(i,j) \times d \quad (2)$$

In equation (2), I(i, j) is a directional vector from the center of the image to the pixel (i, j) after correcting the distortion. I'(i, j) is a directional vector from the center of the image to the coordinates of the pixel (i, j) before correcting the distortion. d is the image height of the pixel (i, j) after correcting the distortion in units of pixels. d' is the image height of the pixel (i, j) in units of pixels before correcting the distortion, which is calculated using the distortion correction LUT.

In step S804, the lens aberration correction circuit 402 performs bi-linear interpolation on the pixel value near the coordinates corresponding to I'(i, j) in the reduced image and determines the pixel value of the pixel (i, j).

The super-resolution processing according to the present exemplary embodiment is realized using the MAP estimation method by performing the iterative calculation process. The super-resolution processing includes two steps, i.e., a relative displacement calculation process for matching the positions of a plurality of images, and an image combining process for generating a high-resolution image from the calculated relative displacement and an input image group. The processes will be sequentially described below.

Figure 9:
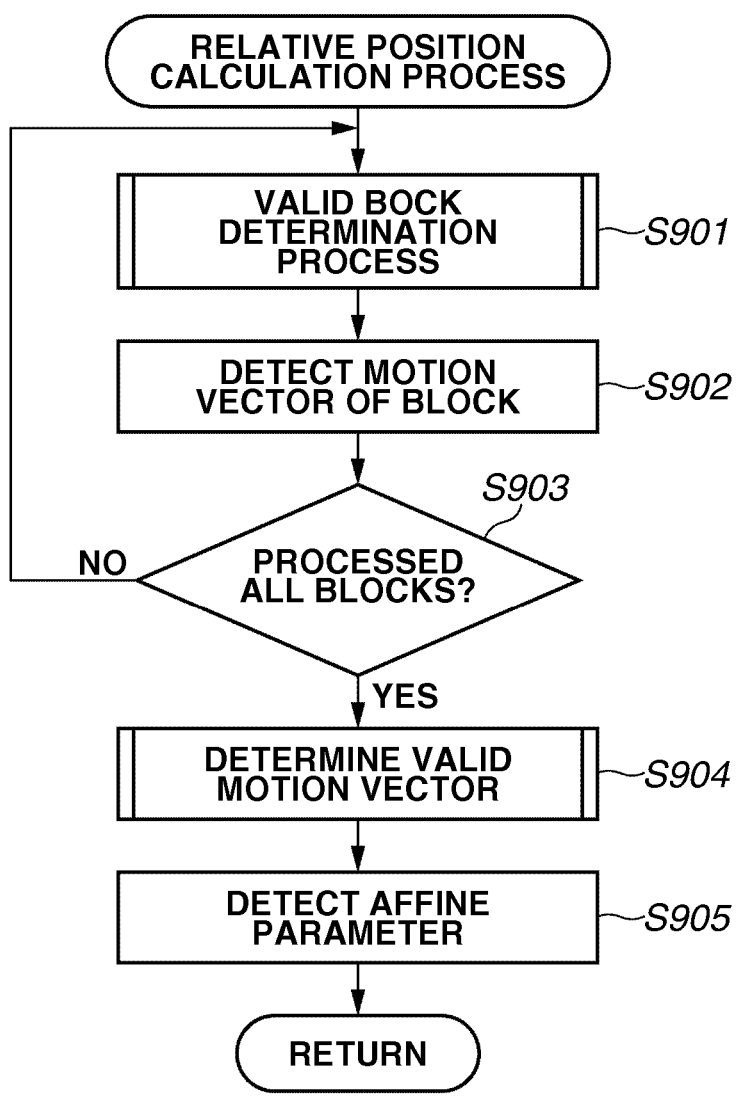
FIG. 9 is a flowchart illustrating an example of a process for acquiring relative displacement between frames.

FIG. 9 is a flowchart illustrating an example of a process for calculating the relative displacement between the frames. The method by which the super-resolution processing circuit 404 acquires the motion vector for each block and the displacement of the entire screen as an affine parameter will be described below.

In step S901, the super-resolution processing circuit 404 determines a valid block before acquiring the motion vector for each block. The process is performed to eliminate the block in which a correct motion vector may not be acquired. The process performed in step S901 will be illustrated in detail in FIG. 10 to be described below.

In step S902, the super-resolution processing circuit 404 calculates the motion vector of the block. A general block-matching method will be described below. The block-matching method employs a square sum or an absolute value sum of the difference between the pixels in the block as an evaluation value of the matching. In the block-matching method, the evaluation value is acquired by sequentially moving the target block whose vector is to be acquired, within a search range of a reference image. The position of the smallest evaluation value among all evaluation values acquired within the search range is the position having the highest correlation with the target block. The displacement thereof thus becomes the motion vector. A method in which the evaluation value is acquired one pixel at a time in the search range is referred to as a full search. In contrast, a method in which a minimum evaluation value is acquired at intervals in the search range and then a detailed search is performed in the vicinity of the acquired minimum value is referred to as a step search. The step search is well-known as a high-speed method for acquiring the motion vector.

In step S903, the super-resolution processing circuit 404 determines whether all blocks have been processed. If all blocks have been processed (YES in step S903), the process proceeds to step S904. If not all blocks have been processed (NO in step S903), the process returns to step S901. In step S904, the super-resolution processing circuit 404 determines a valid motion vector. This is a process for eliminating the motion vector whose calculation result is determined to be incorrect. The process of step S904 will be illustrated in detail in FIG. 11 described below.

In step S905, the super-resolution processing circuit 404 detects the affine parameter from the valid motion vectors.

The affine parameter detection will be described in detail below. If the center coordinates of the target block are (x, y), and the center coordinates of the block in the reference image move to (x', y') as the result of calculating the motion vector, such a relation can be expressed as in equation (3).

$$\begin{pmatrix} x' \\ y' \\ 1 \end{pmatrix} = \begin{pmatrix} a & b & c \\ d & e & f \\ 0 & 0 & 1 \end{pmatrix} \cdot \begin{pmatrix} x \\ y \\ 1 \end{pmatrix} \quad (3)$$

A 3×3 matrix in equation (3) is an affine transformation matrix. Each element in the matrix is the affine parameter, and when a=1, b=0, d=0, and e=1, the transformation becomes a parallel shift in which c is the displacement in a horizontal direction, and f is the displacement in a vertical direction. Further, a rotational shift at a rotational angle θ can be expressed as a=cos θ, b=−sin θ, d=sin θ, and e=cos θ. Equation (3) can also be expressed in a generalized matrix form as in equation (4).

$$x' = A \cdot x \quad (4)$$

In equation (4), x and x' are 1×3 matrices, and A is a 3×3 matrix. If there are n valid motion vectors, the coordinate values of the target image can be expressed as an n×3 matrix as in equation (5).

$$X = (x1, x2, \ldots, xn) \quad (5)$$

The coordinate values after displacement can be expressed as an n×3 matrix as in equation (6), similarly as equation (5).

$$X' = (x'1, x'2, \ldots, x'n) \quad (6)$$

When there are n motion vectors, the coordinate values are thus expressed as in equation (7).

$$X' = A \cdot X \quad (7)$$

In other words, if the affine matrix A in equation (7) can be acquired, the matrix becomes the positional displacement of the entire screen. The affine matrix can be acquired as equation (8) by modifying equation (7).

$$A = X' \cdot XT \cdot (X \cdot X)T - 1 \quad (8)$$

The displacement of the entire screen can be expressed by the parameter of the affine transformation in the above-described method. It can thus be applied to a blur caused by rolling in an in-plane direction, and a zoom blur in a back and forth direction, in addition to a shift blur generated when the user is holding the digital camera.

Figure 10:
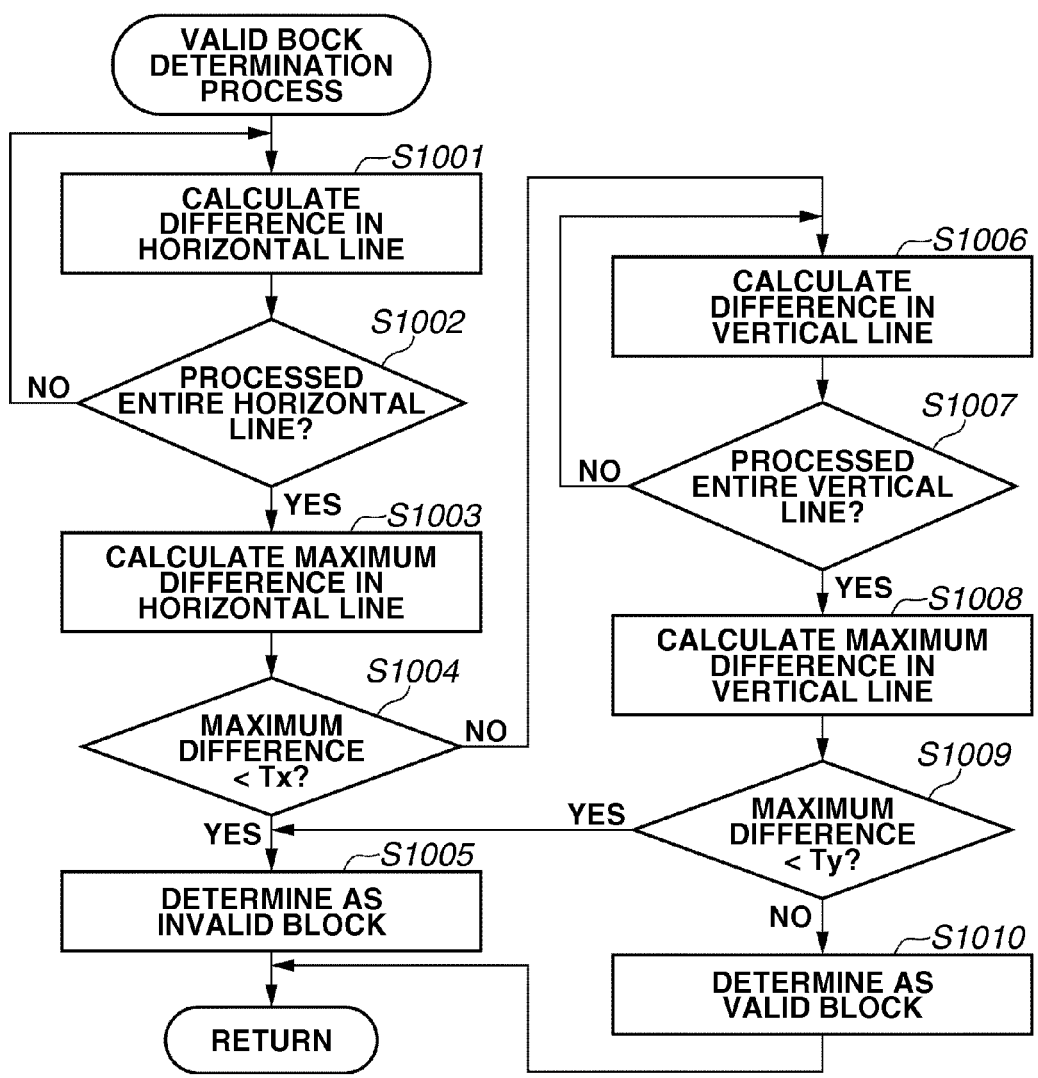
FIG. 10 is a flowchart illustrating an example of a process for eliminating a block in a flat portion.

The valid block determination process will be described below wither reference to the flowchart illustrated in FIG. 10.

When the correlation between the blocks is to be acquired by performing block matching, it is necessary for the image in the block to have a feature quantity. The correct motion vector cannot be acquired in a block which is flat and only includes a direct current (DC) component. In contrast, if the block includes the edge in the horizontal direction or the vertical direction, matching can be easily performed. FIG. 10 is a flowchart illustrating an example of a process for eliminating the blocks in the flat portion. The process to be performed on one block will be described below.

In step S1001, the super-resolution processing circuit 404 calculates a difference between a maximum value and a minimum value in one line in the horizontal direction in the block. For example, if the size of the block is 50×50 pixels, the super-resolution processing circuit 404 acquires the maximum value and the minimum value from 50 pixels in the horizontal direction in the block and calculates the difference between the values. In step S1002, the super-resolution processing circuit 404 repeats the calculation for the number of horizontal lines, i.e., 50 times. In step S1003, the super-resolution processing circuit 404 acquires the maximum difference from 50 calculated differences.

In step S1004, the super-resolution processing circuit 404 compares the maximum difference with a previously set threshold value Tx. If the maximum difference is smaller than the threshold value Tx (YES in step S1004), the block is determined to have no feature quantity in the horizontal direction. In step S1005, the super-resolution processing circuit 404 determines the block to be an invalid block. On the other hand, if it can be determined that the block has a feature quantity in the horizontal direction (NO in step S1004), the super-resolution processing circuit 404 performs a similar verification in the vertical direction.

In step S1006, the super-resolution processing circuit 404 calculates the difference between the maximum value and the minimum value in one line in the vertical direction within the block. More specifically, the super-resolution processing circuit 404 acquires the maximum value and the minimum value from 50 pixels in the vertical direction in the block and calculates the difference between the acquired values. In step S1007, the super-resolution processing circuit 404 repeats the calculation for the number of vertical lines, i.e., 50 times.

In step S1008, the super-resolution processing circuit 404 acquires the maximum difference from 50 calculated differences.

In step S1009, the super-resolution processing circuit 404 compares the maximum difference with a previously set threshold value Ty. If the maximum difference is smaller than the threshold value Ty (YES in step S1009), the block is determined to have no feature quantity in the vertical direction. In step S1005, the super-resolution processing circuit 404 determines the block to be an invalid block. If the block has the feature quantities in the horizontal direction and the vertical direction (NO in step S1009), correct block matching can be expected to be performed. In step S1010, the super-resolution processing circuit 404 thus determines the block to be a valid block.

Figure 11:
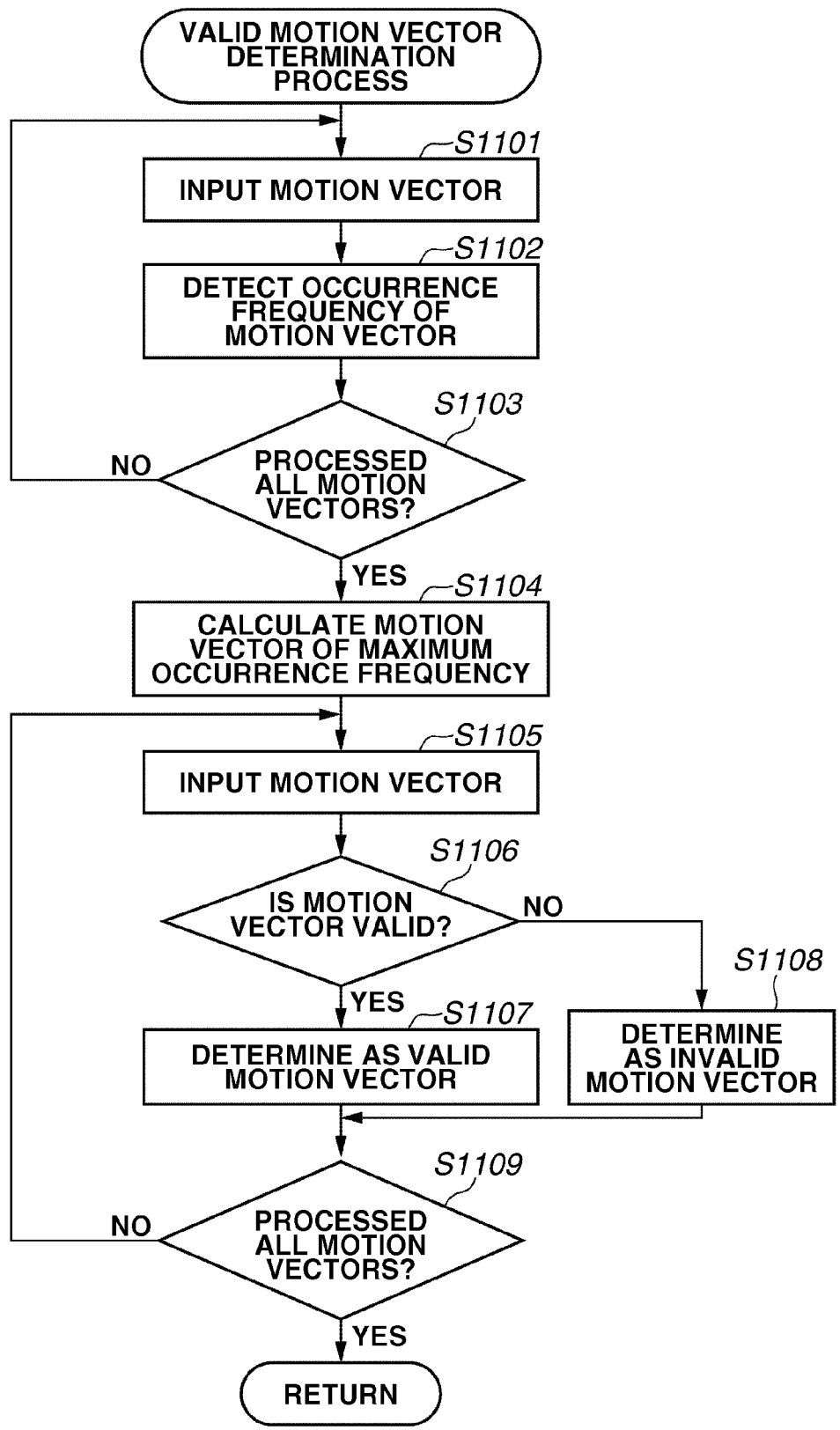
FIG. 11 is a flowchart illustrating an example of a valid motion vector determination process.

The valid motion vector determination process will be described below with reference to the flowchart illustrated in FIG. 11.

In step S1101, the super-resolution processing circuit 404 inputs the motion vector detected in step S902 illustrated in FIG. 9.

In step S1102, the super-resolution processing circuit 404 calculates an occurrence frequency of the motion vector.

In step S1103, the super-resolution processing circuit 404 repeats the process until the occurrence frequencies of all motion vectors are acquired. In step S1104, the super-resolution processing circuit 404 then acquires the motion vector of the maximum occurrence frequency.

In step S1105, the super-resolution processing circuit 404 again inputs the motion vector.

In step S1106, the super-resolution processing circuit 404 determines whether the input motion vector is the motion vector of the maximum occurrence frequency or near (within a predetermine range) the motion vector of the maximum occurrence frequency. If the blur of the entire screen is only the shift blur, the motion vector of each block proximately matches the motion vector of the maximum occurrence frequency. If there is the blur due to rolling, the motion vector is generated near the motion vector of the maximum occurrence frequency.

If the input motion vector is thus the motion vector of the maximum occurrence frequency or near (within a predetermine range from) the motion vector of the maximum occurrence frequency (YES in step S1106), the process proceeds to step S1107. In step S1107, the super-resolution processing circuit 404 determines that the input motion vector is a valid motion vector. On the other hand, if the input motion vector is not the motion vector of the maximum occurrence frequency or near (within a predetermine range from) the motion vector of the maximum occurrence frequency (NO in step S1106), the process proceeds to step S1108. In step S1108, the super-resolution processing circuit 404 determines that the input motion vector is an invalid motion vector. In step S1109, the super-resolution processing circuit 404 determines whether the process is performed on all motion vectors and repeats the process from step S1105 until the process is completed.

According to the present exemplary embodiment, the super-resolution processing circuit 404 performs the image combining process by employing the MAP estimation method. In other words, the super-resolution processing according to the present exemplary embodiment maximizes the posterior probability of the output image (correction image) that is estimated from the input image group. When X indicates the input image group with respect to the posterior probability P(X|Y), Y can be expressed as equation (9).

$$Y = D(h)MX + n \quad (9)$$

In equation (9), D(h) is a matrix in which is reflected a rate of a regional enlargement when lens aberration correction is performed. D(h) is calculated from the deviation (amount of distortion) between the image height at the time of photographing and the ideal image height. Further, M is a matrix indicating the positional deviation between the images, and n indicates noise.

The method for generating the matrix M that expresses the positional deviation between the images will be described below. The matrix M is determined by the affine parameter which indicates the relation between the reference image and the target image acquired by the above-described relative displacement calculation. The super-resolution processing circuit 404 determines one of a plurality of input image data as the reference image and the other image data as the target image. The pixel position (x, y) in equation (3) corresponds to the pixel position in the target image, and the pixel position (x', y') corresponds to the pixel position in the reference image. The super-resolution processing circuit 404 can then determine the coordinate position in the reference image that corresponds to the pixel position (x, y) in the target image from the above-described correspondence relationship and the estimated affine parameter. Such a correspondence relationship is reflected in the matrix M.

If the pixel position (x', y') is plotted on a grid point of the reference image as a result of the correspondence relationship, the super-resolution processing circuit 404 defines the element in the matrix M which corresponds to the pixel position in the reference image as 1 and assigns 0 to the other elements. On the other hand, if the pixel position (x', y') is not plotted on the grid point of the reference image as a result of the correspondence relationship, the super-resolution processing circuit 404 calculates a coefficient of the matrix M as a sum of weighting coefficients of the pixel values of the neighboring pixels of (x', y'). The super-resolution processing circuit 404 calculates the coefficient from the pixel values of the neighboring pixels of (x', y') using interpolation such as linear interpolation. The super-resolution processing circuit 404 assigns weighted values assigned to the neighboring pixels of (x', y') to each of the elements in rows and columns in the matrix M determined from the positions of (x, y) and the neighboring pixels of (x', y'). The super-resolution processing circuit 404 then assigns 0 to the other elements and thus generates the matrix M that indicates the positional displacement between images.

Figure 12:
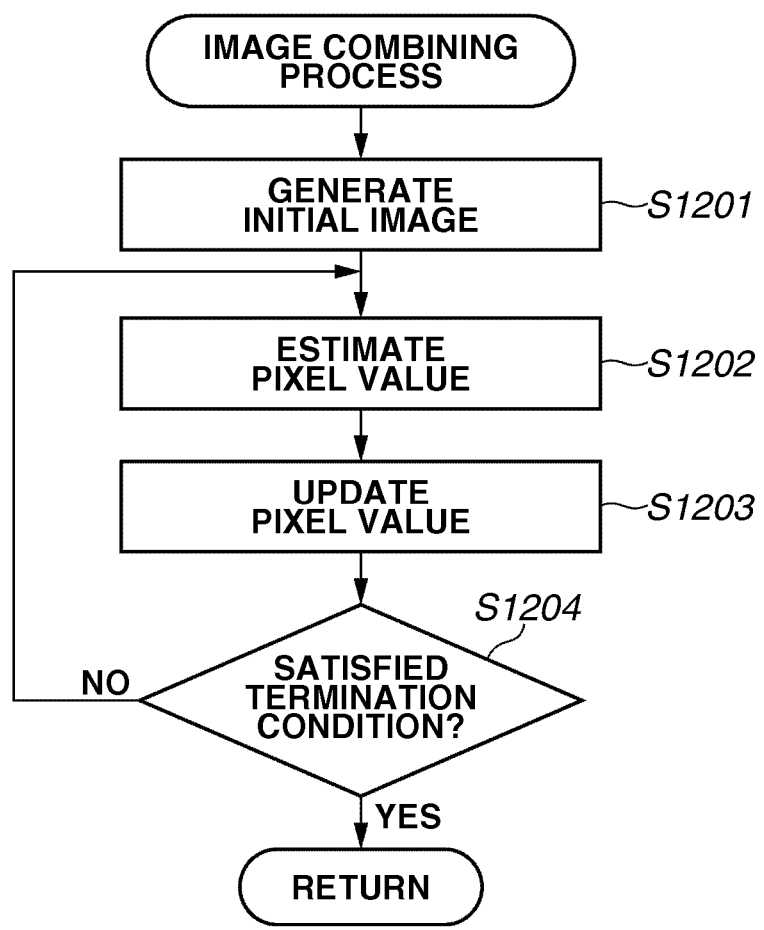
FIG. 12 is a flowchart illustrating an example of an image combining process using the MAP estimation method.

In the super-resolution processing using the MAP estimation method, the super-resolution processing circuit 404 generates the initial image from the input image and estimates the status using a preset probability density function. The super-resolution processing circuit 404 iterates the estimation until the termination condition is satisfied and thus calculates the optimal solution. FIG. 12 is a flowchart illustrating an example of the image combining process using the MAP estimation method.

In step S1201, the super-resolution processing circuit 404 generates the initial image using a mean value of the pixel values of the input image group. In step S1202, the super-resolution processing circuit 404 estimates the pixel value for each pixel using the probability density function indicated by equation (9).

Figure 13:
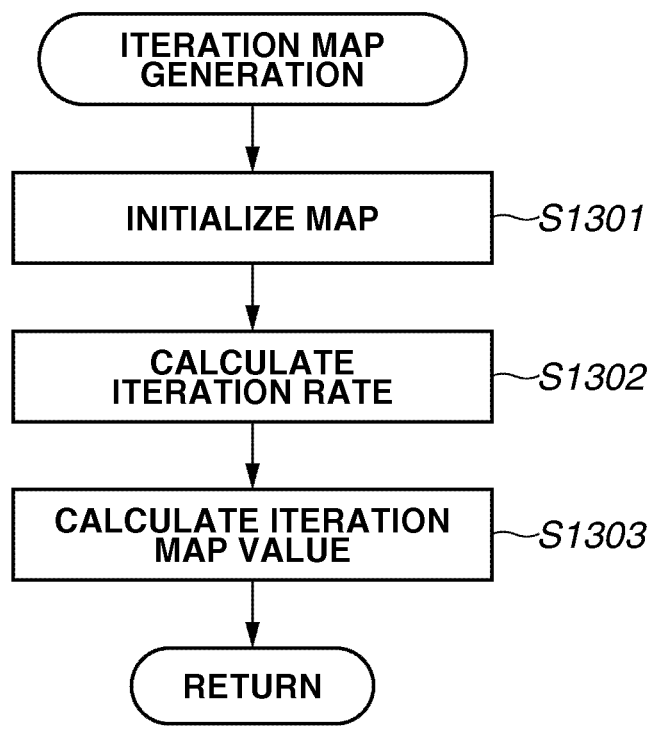
FIG. 13 is a flowchart illustrating an example of an iteration map generation process.

The super-resolution processing circuit 404 refers to an iteration map and applies the estimation process only when a number of iterations of the corresponding pixel is not reached. The iteration map is the bit map data of the same width and height as the output pixel, and the pixel value is the maximum value of the number of iterations of each pixel. If one bit map is considered to be one image area, the iteration map is the number of iterations set to each image area. The unit of the image area is not limited to pixels as described above and may be the image height or m×n blocks. The method for generating the iteration map is illustrated in FIG. 13 described below. If the estimation is not to be performed, the super-resolution processing circuit 404 directly uses the pixel value before estimation as the pixel value after estimation.

In step S1203, the super-resolution processing circuit 404 updates the pixel value of the pixel whose pixel value has changed in step S1202. According to the present exemplary embodiment, the estimation value acquired in step S1202 is used in updating the pixel value. However, the super-resolution processing circuit 404 may calculate the pixel value to be updated from the pixel values before and after the estimation according to a predetermined updating ratio.

In step S1204, the super-resolution processing circuit 404 determines whether the termination condition is satisfied by all pixels. If all pixels satisfy the termination condition (YES in step S1204), the process ends. If there is any pixel that does not satisfy the termination condition (NO in step S1204), the process returns to step S1202, and the super-resolution processing circuit 404 again estimates the pixel value.

The termination condition according to the present exemplary embodiment is that the status of all pixels are not updated before and after the estimation.

FIG. 13 is a flowchart illustrating an example of the iteration map generation process (i.e., an iteration map setting process).

In step S1301, the super-resolution parameter generation circuit 403 generates the bit map of the same width and height as the image after the lens aberration is corrected and initializes the bit map by 0.

In step S1302, the super-resolution parameter generation circuit 403 determines an iteration rate for each image area from a value of the distortion correction LUT size fs used in the lens aberration correction process. According to the present exemplary embodiment, the super-resolution parameter generation circuit 403 determines the number of iterations according to the absolute value of the deviation. The iteration rate can be expressed as equation (11).

$$\alpha = N/m \quad (11)$$

In equation (11), m is a predetermined reference deviation. If the iteration rate is defined as equation (11), and the number of iterations is set to 50 times when the deviation is 1 mm, the iteration rate α becomes 50. In step S1303, the super-resolution parameter generation circuit 403 calculates the deviation for each pixel by referring to the distortion correction LUT. The super-resolution parameter generation circuit 403 then stores in the iteration map integer values acquired by multiplying the deviation by the iteration rate α. If a negative value is acquired by the calculation, the super-resolution parameter generation circuit 403 stores 0 in the iteration map.

The digital camera according to the present exemplary embodiment can control, by using the above-described iteration map, the number of times of estimation according to the magnitude of an effect of the sharpness reduction due to lens aberration correction. In other words, the digital camera does not perform the estimation process on the pixel whose pixel value is not updated when the lens aberration is corrected. The digital camera instead applies the estimation process a number of times on the pixels whose pixel value greatly changes when the lens aberration is corrected. As a result, the entire image can be evenly corrected, and unnecessary estimation can be omitted so that processing speed can be greatly improved.

According to the present exemplary embodiment, the digital camera generates a high-resolution image using the MAP estimation method. However, the digital camera may generate a high-resolution image using other high-resolution image generation processing methods including loop processing. For example, the digital camera may generate a high-resolution image using a method of projection onto convex sets (POCS) method, POCS-maximum likelihood (ML) method, and back projection method. Further, the digital camera according to the present exemplary embodiment uses the iteration map to reduce the number of estimations. However, the digital camera may determine, according to the deviation between the image height at the time of photographing and the ideal image height, the parameters other than the number of iterations of the estimation process. The digital camera may then generate a high-resolution image using the determined parameters. For example, the digital camera may provide a convergence term in the probability density function P(x|y), so that the process converges earlier according to the deviation.

Furthermore, the digital camera may change the value of the updating ratio for each pixel by using the deviation between the image height at the time of photographing and the ideal image height. According to the present exemplary embodiment, the estimated pixel value is directly employed. However, the digital camera may update the pixel value using a weighted mean with respect to the pixel values after the estimation. The updating ratio indicates the weight of the pixel after the estimation. By increasing the weight of the estimation value as the deviation is smaller, the process can converge earlier.

As described above, according to the present exemplary embodiment, the super-resolution processing (i.e., high-resolution processing) converts a plurality of frames to a high-resolution image. In such processing, the parameter is determined according to the displacement (or a regional enlargement rate) of the pixel due to correcting the lens aberration. As a result, the sharpness which is reduced by performing the lens aberration correction process can be recovered at high speed.

The digital camera according to the first exemplary embodiment performs the lens aberration correction process on all images that are obtained by time-division exposure (i.e., a plurality of time-division exposure images). In such a method, the digital camera can calculate the image size after the distortion is corrected from the lens correction table. The required memory amount can thus be calculated before performing the lens aberration correction process and the super-resolution processing. Further, since the processing is performed pixel-by-pixel, only a small amount of memory is used.

However, since the process according to the first exemplary embodiment applies the lens aberration correction process on all time-division exposure images, it is not efficient in terms of calculation cost. According to a second exemplary embodiment of the present invention, the super-resolution processing is performed first to combine a plurality of images into one image, and the lens aberration correction process is then applied on one image (acquired by performing the super-resolution processing). As a result, the total calculation cost can be reduced as will be described below.

Figure 14:
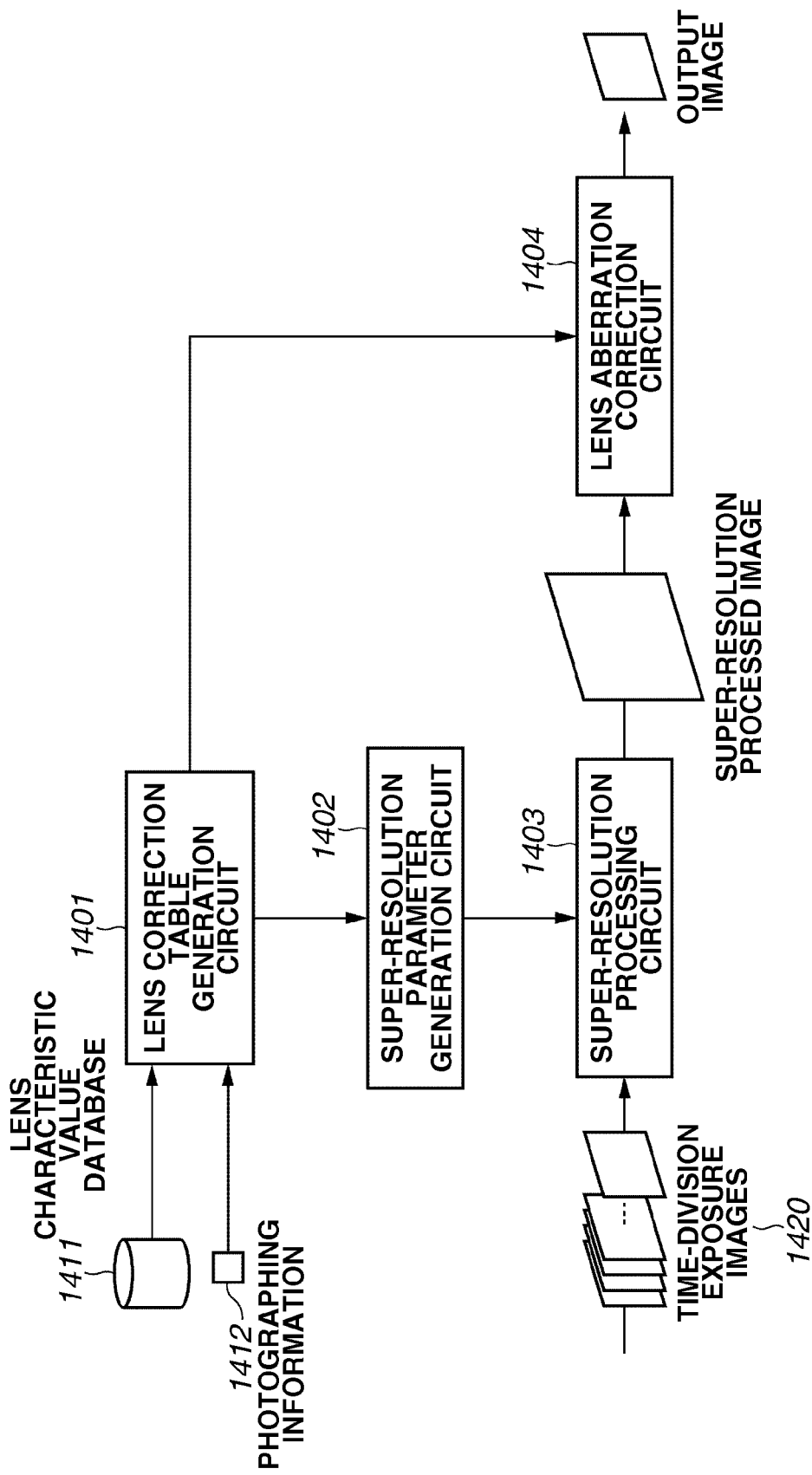
FIG. 14 illustrates a configuration of a digital camera that performs the lens aberration correction process according to a second exemplary embodiment of the present invention.

FIG. 14 illustrates a configuration of the digital camera that performs the lens aberration correction process according to the second exemplary embodiment of the present invention. The digital camera according to the present exemplary embodiment is different from the digital camera according to the first exemplary embodiment in that a super-resolution processing circuit 1403 combines time-division exposure images 1420 into one image. According to the first exemplary embodiment, the resolution of the image data does not change before and after performing the super-resolution processing. In contrast, according to the present exemplary embodiment, the super-resolution processing circuit 1403 outputs a high-resolution image by considering the effect of image deterioration due to the lens aberration correction process.

For example, the super-resolution processing circuit 1403 calculates the output resolution using the maximum value of the rate by which the image data is enlarged in performing lens aberration correction. The super-resolution processing circuit 1403 then generates the image with such resolution. A lens aberration correction circuit 1404 applies the lens aberration correction process on the enlarged image data and reduces the image data to the original resolution, so that the sharpness reduction due to lens aberration correction can be avoided.

According to the present exemplary embodiment, the output image resolution of the super-resolution processing circuit 1403 is determined according to an enlargement rate β calculated using equation (12).

$$\beta = I(h\_max)/I'(h\_max) \quad (12)$$

In equation (12), h_max is an image height at which the deviation between the ideal image height and the image height at time of photographing becomes greatest. I'(h) is the image height at the time of photographing, and I(h) is the ideal image height. If β<1, the value of β is set to 1. The size of the output image of the super-resolution processing is thus acquired by multiplying the width and height of the frame image by the enlargement rate.

According to the present exemplary embodiment, the iteration map is used for determining the processing parameters of the super-resolution processing, similar to the first exemplary embodiment. Since the image is enlarged according to the present exemplary embodiment, it is desirable to determine the iteration rate α so that the number of iterations becomes greater than the number of iterations according to the first exemplary embodiment. According to the present exemplary embodiment, the iteration rate a is thus expressed as in equation (13), using a predetermined maximum number of iterations N and a maximum deviation between the ideal image height and the image height at the time of photographing d_max.

$$\alpha = N/d\_max \quad (13)$$

In other words, according to the present exemplary embodiment, the estimation is iterated N times at maximum on the pixel with the greatest deviation of the image height. The present exemplary embodiment is also advantageous in that a maximum value of the processing time for performing the super-resolution processing can be calculated by setting the maximum number of iterations on the image.

The lens aberration correction process is then applied to the output image of the super-resolution processing circuit 1403, using a method similar to the first exemplary embodiment. The output resolution of the lens aberration correction circuit 1404 is the same as the resolution acquired when the lens aberration correction process is applied to the top frame image of the time-division exposure images 1420. The resolution after applying the lens aberration correction process can be calculated from the lens correction table without actually applying the process. However, since this is not the focus of the present exemplary embodiment, details of the process will be omitted.

By applying the above-described process according to the present exemplary embodiment, the calculation cost can be greatly reduced, and a result similar to that of the first exemplary embodiment can be acquired.

According to the first and second exemplary embodiments, the lens aberration correction process is performed as the image transformation process in which there is a shift of the pixels. According to the present exemplary embodiment, keystone correction which is employed in a projector is applied as an example of the image transformation process similar to the first and second exemplary embodiments.

Figure 15:
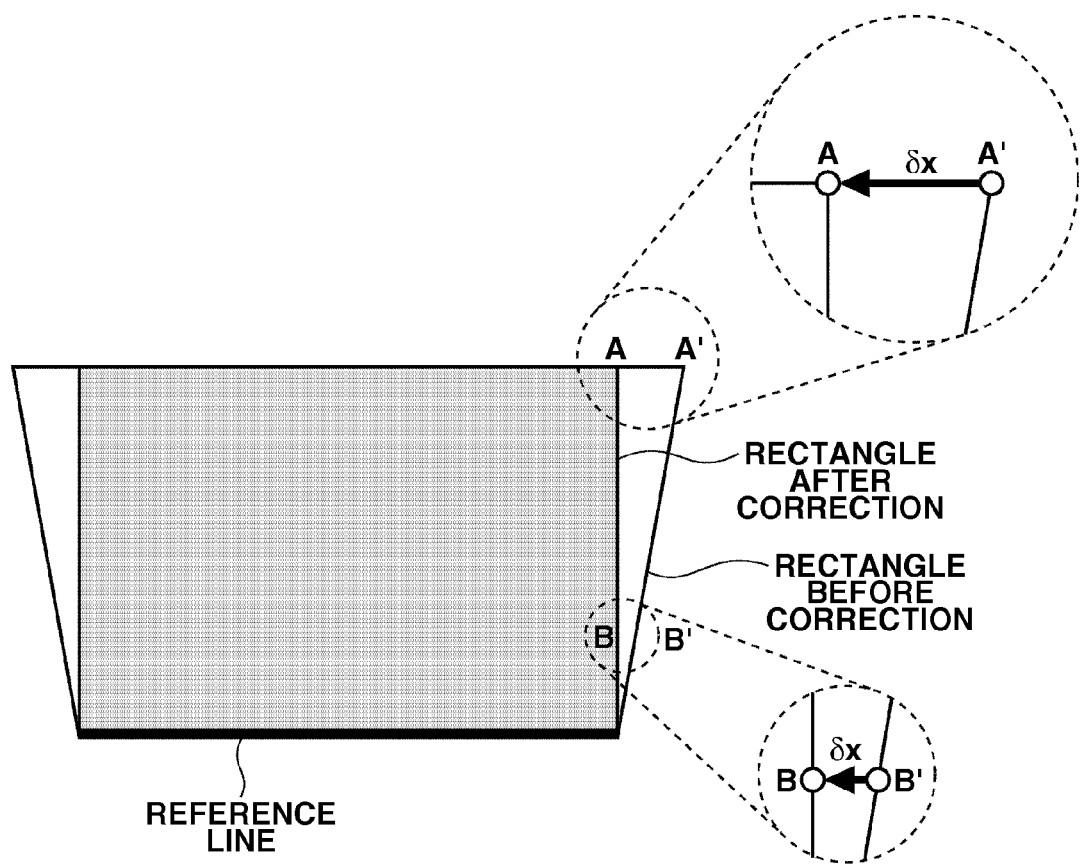
FIG. 15 illustrates displacement of the pixel in keystone correction.

FIG. 15 illustrates the displacement of the pixels in performing keystone correction according to a third exemplary embodiment of the present invention. Referring to FIG. 15, keystone correction is realized by fixing a specific reference line (a bottom line of a screen in the example illustrated in FIG. 15) and changing the size in the vertical direction and the horizontal direction. In the example illustrated in FIG. 15, correction is limited to a tilt direction of the screen for ease of description.

As illustrated in FIG. 15, the displacement of the pixel (i.e., a regional enlargement rate) in the keystone correction process is different depending on a location. If a continuous image including a blur in units of sub-pixels is input, the digital camera can thus apply the super-resolution processing with an optimal parameter for each coordinate point, using the process described in the first and second exemplary embodiments.

In the keystone correction process, the image data size is basically reduced, so that it is not effective in an implementation which is limited to an enlarging direction as described in the first and second exemplary embodiments. However, the portion which is reduced by performing keystone correction is the portion in which the sharpness is reduced by being enlarged when projected. As a result, the sharpness is not improved even when the portion is reduced by performing keystone correction.

The digital camera according to the present exemplary embodiment thus increases the number of estimations in performing super-resolution processing as the enlargement rate decreases, unlike the first and second exemplary embodiments. By applying such a process, a reduced image with higher sharpness can be acquired, and a good correction result can be acquired across the entire screen.

According to the above-described exemplary embodiments, the functions of the present invention are implemented in the digital camera as hardware, such as the image processing circuit 125, the displacement calculation circuit 126, and the image combining circuit 127. However, the functions may be implemented as software (programs) in the digital camera.

The present invention can also be achieved by providing a storage medium which stores software (program code) for implementing functions of the above-described exemplary embodiments to an apparatus. The program code stored in the storage medium can be read and executed by a computer (a central processing unit (CPU) or a micro-processing unit (MPU)) of the system or the apparatus.

An operating system (OS) or the like working on a computer can also perform a part or the whole of processes according to instructions of the software (program code) and realize functions of the above-described exemplary embodiments.

In a case where the above-described exemplary embodiments are applied to the storage medium, the storage medium (a computer-readable storage medium) stores the program codes corresponding to the flowcharts described above.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-191071 filed Aug. 20, 2009, which is hereby incorporated by reference herein in its entirety.

What is claimed is:

1. An image processing apparatus for generating corrected image data from a plurality of input image data by performing an iterative calculation process, the apparatus comprising:
    an input unit configured to input the plurality of input image data;
    an acquisition unit configured to acquire a photographing parameter used for photographing to acquire the input image data;
    a setting unit configured to set, for each image area, a number of iterations for generating the corrected image data based on the photographing parameter, wherein a number of iterations for a first image area is different from a number of iterations for a second image area; and
    a generation unit configured to generate corrected image data from the plurality of image data by performing an iterative calculation process on each image area based on the number of iterations set for each image area, the generation unit generates the corrected image data from the plurality of input image data by performing super-resolution processing,
    wherein the number of iterations for each image area set by the setting unit is set based on an amount of distortion of the image,
    wherein the amount of distortion is determined based on a displacement of a pixel in the image.

2. The image processing apparatus according to claim 1, wherein the plurality of input image data input by the input unit is image data indicating an image in which lens aberration is corrected.

3. The image processing apparatus according to claim 1, further comprising an aberration correction unit configured to perform lens aberration correction on the corrected image data generated by the generation unit.

4. The image processing apparatus according to claim 2, wherein an image on which the lens aberration correction is performed is an image on which a keystone correction process is performed.

5. The image processing apparatus according to claim 1, wherein the plurality of input image data is acquired by performing time-division exposure.

6. The image processing apparatus according to claim 1, wherein the image area is set according to an image height of an image indicated by input image data, and
    wherein the number of iterations of an image area of high image height is greater than the number of iterations of an image area of low image height.

7. The image processing apparatus according to claim 1, wherein a unit of the image area is a pixel.

8. The image processing apparatus according to claim 1, wherein a unit of the image area is an image height.

9. The image processing apparatus according to claim 1, wherein the setting unit sets, for each area, the number of iterations for generating the corrected image data based on a characteristic of a lens and a photographing parameter of an imaging apparatus used for photographing to acquire the input image data.

10. An image processing method for generating corrected image data from a plurality of input image data by performing an iterative calculation process, the method comprising:
    inputting the plurality of input image data;
    acquiring a photographing parameter used for photographing to acquire the input image data;
    setting, for each image area, a number of iterations for generating the corrected image data based on the photographing parameter, wherein a number of iterations for a first image area is different from a number of iterations for a second image area; and
    generating corrected image data from the plurality of image data by performing an iterative calculation process on each image area based on the number of iterations set for each image area, generating the corrected image data from the plurality of input image data by performing super-resolution processing,
    wherein the number of iterations for each image area is set based on an amount of distortion of the image,
    wherein the amount of distortion is determined based on a displacement of a pixel in the image.

11. A non-transitory computer-readable medium storing a program for causing an image processing apparatus to perform the image processing method comprising:
    inputting the plurality of input image data;
    acquiring a photographing parameter used for photographing to acquire the input image data;
    setting, for each image area, a number of iterations for generating the corrected image data based on the photographing parameter, wherein a number of iterations for a first image area is different from a number of iterations for a second image area; and
    generating corrected image data from the plurality of image data by performing an iterative calculation process on each image area based on the number of iterations set for each image area, generating the corrected image data from the plurality of input image data by performing super-resolution processing,
    wherein the number of iterations for each image area is set based on an amount of distortion of the image,
    wherein the amount of distortion is determined based on a displacement of a pixel in the image.

* * * * *